US012620332B2

(12) United States Patent

Tseng

(10) Patent No.: US 12,620,332 B2

(45) Date of Patent: May 5, 2026

(54) DISPLAY PANEL WITH REGIONAL VARIABLE REFRESH RATES AND DRIVE METHOD

(71) Applicant: Everdisplay Optronics (Shanghai) Co., Ltd., Shanghai (CN)

(72) Inventor: Ying-Hsiang Tseng, Shanghai (CN)

(73) Assignee: Everdisplay Optronics (Shanghai) Co., Ltd., Shanghai (CN)

( * ) Notice: Subject to any disclaimer, the term of this patent is extended or adjusted under 35 U.S.C. 154(b) by 0 days.

(21) Appl. No.: 18/727,117

(22) PCT Filed: Feb. 23, 2023

(86) PCT No.: PCT/CN2023/077890
§ 371 (c)(1),
(2) Date: Jul. 8, 2024

(87) PCT Pub. No.: WO2024/119627
PCT Pub. Date: Jun. 13, 2024

(65) Prior Publication Data

US 2025/0078711 A1 Mar. 6, 2025

(30) Foreign Application Priority Data

Dec. 5, 2022 (CN) ......................... 202211548369.7

(51) Int. Cl.
*G09G 3/20* (2006.01)

(52) U.S. Cl.
CPC ........... *G09G 3/20* (2013.01); *G09G 2310/04* (2013.01); *G09G 2320/043* (2013.01); *G09G 2330/021* (2013.01); *G09G 2340/0435* (2013.01)

(58) Field of Classification Search
None
See application file for complete search history.

(56) References Cited

U.S. PATENT DOCUMENTS

2017/0221411 A1* 8/2017 Chang .................. G11C 19/287
2021/0407424 A1* 12/2021 Long .................... G09G 3/3266

FOREIGN PATENT DOCUMENTS

CN 104123906 A 10/2014
CN 106157917 A 11/2016
(Continued)

OTHER PUBLICATIONS

CN108461062A Espacenet translation (Year: 2018).*
International Search Report dated Aug. 16, 2023 of International Application No. PCT/CN2023/077890.

*Primary Examiner* — Donna V Bocar
(74) *Attorney, Agent, or Firm* — Qinghong Xu

(57) ABSTRACT

Provided are a display panel with regional variable refresh rates and a driving method. The display panel includes: a region classification module for detecting in a display region of said panel row information corresponding to a static display region with an invariable picture and to a dynamic display region with a variable picture, and generating control signal groups of corresponding states; and a driving circuit for receiving a first control signal group corresponding to the static display region, so that drive voltages of related pixel rows of the static display region are output to the next row drive circuit, and an output signal of the drive circuit retains at a high level, or receiving a second control signal group corresponding to the dynamic display region, so that drive voltages of related pixel rows of the dynamic display region are output to both the next row drive circuit and the output signal of the drive circuit.

16 Claims, 8 Drawing Sheets

(56) References Cited

FOREIGN PATENT DOCUMENTS

| | | | |
|---|---|---|---|
| CN | 108461062 | A | 8/2018 |
| CN | 108470540 | A | 8/2018 |
| CN | 111462710 | A | 7/2020 |
| CN | 113178161 | A | 7/2021 |
| CN | 113689825 | A | 11/2021 |
| CN | 115250633 | A | 10/2022 |
| JP | 2015041182 | A | 3/2015 |
| KR | 20220006729 | A | 1/2022 |

* cited by examiner

DISPLAY PANEL WITH REGIONAL VARIABLE REFRESH RATES AND DRIVE METHOD

CROSS-REFERENCE TO RELATED APPLICATION

The present application is a US national phase of International Application No. PCT/CN2023/077890, filed on Feb. 23, 2023, which is based upon and claims priority to Chinese Patent Application No. 202211548369.7, filed on Dec. 5, 2022, the entire contents of both of which are incorporated herein by reference.

TECHNICAL FIELD

The present disclosure relates to the field of display panel control circuits, and in particular to a display panel with regional varying refresh rates and a driving method.

BACKGROUND

As a new generation of display technology, an Organic Light Emitting Diode (OLED) display has advantages of low power consumption, high color gamut, high brightness, high refresh rate, wide viewing angle, high response speed, etc. In particular, the advantage of high refresh rate makes OLED display more suitable for display of mobile devices, and therefore it is increasingly widely used.

The refresh rate of the display refers to the number of times the image on the screen is repeatedly scanned from top to bottom. The higher the refresh rate, the more stable the displayed image is and the less fatigued the human eyes are. In recent years, as people spend more and more time using mobile devices, the refresh rates of various mobile device displays have been gradually increased in order to provide a better user experience.

However, mobile devices have high requirements for power consumption, and the proportion of power consumption occupied by the display is particularly important. The refresh rate of the display directly affects the power consumption. Although a low refresh rate has lower power consumption, the dynamic image display effect with the low refresh rate seriously affects the display quality.

At present, when using a mobile device, not all images in respective display regions change in real time. In particular, in the case of short video applications, there are a large number of static display regions in the display area where the images do not change for a long time. However, currently all the display regions of the display of the mobile device employs the same refresh rate, that is, a high refresh rate used for a dynamic display region, resulting in a waste of power consumption. Moreover, always working at the highest refresh rate accelerates aging of the display.

SUMMARY

In view of the defects in the related arts, the purpose of the present disclosure is to provide a display panel with regional varying refresh rates and a driving method.

The embodiments of the present disclosure provide a display panel with regional varying refresh rates, including:

an region classification module, configured to detect row information corresponding to a static display region with invariable pictures and a dynamic display region with variable pictures in a display area of the panel, and generate control signal groups for corresponding states; and a driving circuit, configured to receive a first control signal group corresponding to the static display region, to cause a driving voltage of a relevant pixel row of the static display region to be output to a driving circuit of a next row, and cause an output signal of the driving circuit to maintain a high level; or to receive a second control signal group corresponding to the dynamic display region, to cause a driving voltage of a relevant pixel row of the dynamic display region to be output to a driving circuit of a next row and an output signal of the driving circuit, respectively.

In some embodiments, the driving circuit includes a plurality of rows of driving units, and the driving unit includes:

a first transistor, wherein a first electrode of the first transistor is coupled to a first power supply voltage, and a gate of the first transistor is coupled to a first node;

a second transistor, wherein a first electrode of the second transistor is coupled to a second electrode of the first transistor, a second electrode of the second transistor is coupled to a second node, and a gate of the second transistor is coupled to a first input terminal;

a third transistor, wherein a first electrode of the third transistor is coupled to the second node, a second electrode of the third transistor is coupled to a third input terminal, and a gate of the third transistor is coupled to a second input terminal;

a fourth transistor, wherein a first electrode of the fourth transistor is coupled to the first node, a second electrode of the fourth transistor is coupled to the second input terminal, and a gate of the fourth transistor is coupled to the second node;

a fifth transistor, wherein a first electrode of the fifth transistor is coupled to the first node, a second electrode of the fifth transistor is coupled to a second power supply voltage, and a gate of the fifth transistor is coupled to the second input terminal;

a sixth transistor, wherein a first electrode of the sixth transistor is coupled to the first power supply voltage, a second electrode of the sixth transistor is coupled to a third node, and a gate of the sixth transistor is coupled to the first node;

a seventh transistor, wherein a first electrode of the seventh transistor is coupled to the third node, a second electrode of the seventh transistor is coupled to the first input terminal, and a gate of the seventh transistor is coupled to the second node;

a ninth transistor, wherein a first electrode of the ninth transistor is coupled to the third node, and a second electrode of the ninth transistor is coupled to an output terminal;

a tenth transistor, a first electrode of the tenth transistor being coupled to the first power supply voltage, and a second electrode of the tenth transistor being coupled to the output terminal;

a first capacitor, wherein a first electrode of the first capacitor is coupled to the first power supply voltage, and a second electrode of the first capacitor is coupled to the first node;

a second capacitor, wherein a first electrode of the second capacitor is coupled to the second node, and a second electrode of the second capacitor is coupled to the third node;

where a gate of the ninth transistor is coupled to a fourth input terminal; and a gate of the tenth transistor is coupled to a fifth input terminal.

In some embodiments, the first transistor, the second transistor, the third transistor, the fourth transistor, the fifth transistor, the sixth transistor, the seventh transistor, the ninth transistor, and the tenth transistor are all P-type MOS transistors.

In some embodiments, a gate of the ninth transistor and a gate of the tenth transistor respectively receive a first control signal and a second control signal of the first control signal group.

In some embodiments, the first control signal and the second control signal are signals reverse to each other.

In some embodiments, the first transistor, the second transistor, the third transistor, the fourth transistor, the fifth transistor, the sixth transistor, the seventh transistor, and the tenth transistor are all P-type MOS transistors, and the ninth transistor is an N-type MOS transistor.

In some embodiments, a gate of the ninth transistor and a gate of the tenth transistor respectively receive the same control signal of the first control signal group.

In some embodiments, the driving circuit further includes a first signal lead, a second signal lead, a fourth signal lead and a fifth signal lead;

the driving voltage of the driving unit in a previous row is output to the third input terminal of the driving unit in the next row as a starting signal;

the first input terminal is coupled to the first signal lead;

the second input terminal is coupled to the second signal lead;

the fourth input terminal is coupled to the fourth signal lead; and the fifth input terminal is coupled to the fifth signal lead.

In some embodiments, the driving circuit further includes a starting signal lead.

The third input terminal of the driving unit in the first row is coupled to the starting signal lead.

The embodiments of the present disclosure further provide a driving method, which is applied to the driving circuit of the display panel with regional varying refresh rates, the method including:

in the static display region, receiving, by a driving unit of a relevant pixel row, a first control signal group sent jointly by a fourth signal lead and a fifth signal lead, and outputting a driving voltage of the driving unit to a driving unit of a next row, where the output signal of the driving unit is output at a high level to maintain picture data in a previous frame of the pixel row; and in the dynamic display region, receiving, by the driving unit of the relevant pixel row, a second control signal group sent jointly by the fourth signal lead and the fifth signal lead, and outputting the driving voltage of the driving unit to an output signal of the driving unit and the driving unit of the next row, respectively, to update the picture data in the previous frame of the pixel row.

BRIEF DESCRIPTION OF THE DRAWINGS

Other features, objects and advantages of the present disclosure will become more apparent after reading the detailed description of non-limiting embodiments with reference to the following drawings.

REFERENCE NUMERALS

Figure 1:
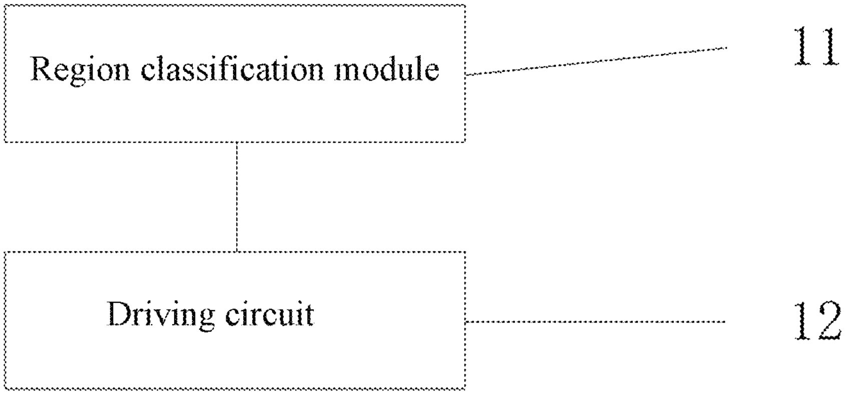
FIG. 1 is a structural block diagram of a display panel with regional varying refresh rates according to the present disclosure.

VDD First power supply voltage
VEE Second power supply voltage
STV Transmission starting signal
CKV1 First clock signal
CKV2 Second clock signal
Gout Output signal
N1 First node
N2 Second node
N3 Third node
T1 First transistor
T2 Second transistor
T3 Third transistor
T4 Fourth transistor
T5 Fifth transistor
T6 Sixth transistor
T7 Seventh transistor
T9 Ninth transistor
T10 Tenth transistor
C1 First capacitor
C2 Second capacitor
IN1 First input terminal
IN2 Second input terminal
IN3 Third input terminal
IN4 Fourth input terminal
IN5 Fifth input terminal
11 Region classification module
12 Driving circuit
1 Static display region
2 Dynamic display region
S1-S7 Scan signals

DETAILED DESCRIPTION

The implementations of the present disclosure are illustrated below through specific examples with reference to the accompanying drawings, and those skilled in the art can easily understand other advantages and effects of the present disclosure from the contents disclosed in the present disclosure. The present disclosure can also be implemented or applied through other different specific implementations, and the details in the present disclosure can also be modified or changed in various ways according to different viewpoints and application systems without departing from the spirit of the present disclosure. It should be noted that the embodiments in the present disclosure and the features in the embodiments can be combined with each other without conflict.

In the expressions of the present disclosure, the expressions with reference to the terms "an embodiment", "some embodiments", "an example", "a specific example", "some examples" or the like mean that the specific features, structures, materials or characteristics described in conjunction with such embodiment or example are included in at least one of the embodiments or examples of the present disclosure. Moreover, the described specific features, structures, materials or characteristics may be combined in any one or more embodiments or examples in a suitable manner. In addition, those skilled in the art may combine and integrate different embodiments or examples and features of the different embodiments or examples described in the present disclosure without contradiction.

In order to clearly describe the present disclosure, components irrelevant to the description are omitted, and the same reference signs are given to the same or similar components throughout the specification.

Throughout the specification, when a certain device is said to be "connected" to another device, it includes not only the case of "direct connection" but also the case of "indirect connection" with other elements interposed therebetween.

When a device is said to be "on" another device, it may be directly on the other device, or there may also be other devices therebetween. In contrast, when a device is said to be "directly on" another device, there is no other device therebetween.

Although in some examples the terms "first", "second", etc. are used herein to indicate various elements, these elements should not be limited by these terms, it should not be understood as indicating or implying relative importance or implicitly indicating the number of technical features indicated. Thus, the features defined by "first" and "second" may include at least one of the features explicitly or implicitly. These terms are only used to distinguish one element from another. For example, expressions such as the first interface and the second interface. Furthermore, as used herein, the singular form of "one", "a" and "the" are intended to also include the plural form, unless there is an indication to the contrary in the context. In the expressions of the present disclosure, the meaning of "multiple" is two or more, unless otherwise clearly and specifically defined. It should be further understood that the terms "comprising" and "including" indicate the existence of features, steps, operations, elements, components, items, types, and/or groups, but do not exclude the existence, occurrence or addition of one or more other features, steps, operations, elements, components, items, types, and/or groups. The terms "or" and "and/or" used herein are interpreted as inclusive, or mean any one or any combination. Thus, "A, B, or C" or "A, B and/or C" means "any of the following: A; B; C; A and B; A and C; B and C; or A, B, and C." An exception to this definition will occur only when a combination of the elements, functions, steps, or operations are inherently mutually exclusive in some manner.

The technical terms used herein are only used to refer to specific embodiments and are not intended to impose limitation on the present disclosure. The singular form used herein also includes the plural form as long as the statement does not clearly indicate the contrary.

Although not defined differently, all terms, including technical and scientific terms used herein, have the same meaning as those generally understood by those skilled in the art to which the present disclosure belongs. The terms defined in commonly used dictionaries are additionally interpreted as having meanings consistent with the relevant technical literature and the contents of the current explanations, and unless defined, shall not be overly interpreted as ideal or very formulaic meanings.

FIG. 1 is a block diagram of a display panel with regional varying refresh rates of the present disclosure. As shown in FIG. 1, a display panel with regional varying refresh rates of the present disclosure includes: a region classification module and a driving circuit. The region classification module is mainly used to detect row information corresponding to a static display region with invariable pictures and a dynamic display region with variable pictures in a display area of the panel, and generate control signal groups for corresponding states. The driving circuit is mainly used to receive a first control signal group corresponding to the static display region, to cause a driving voltage of a relevant pixel row of the static display region to be output to the driving circuit of the next row; and cause an output signal of the driving circuit to maintain a high level; or to receive a second control signal group corresponding to the dynamic display region, to cause the driving voltage of the relevant pixel row of the dynamic display region to be output to the driving circuit of the next row and the output signal of the driving circuit, respectively. Thus, the display panel of the present disclosure can adjust the refresh rates of the picture regions by region through the cooperation of the region classification module and the driving circuit, maintain a high refresh rate in the dynamic display region of the picture of the display panel, and adjust the static display region in the picture to a low refresh rate, thereby reducing the power consumption of the display panel and extending the service life of the display panel.

Figure 2:
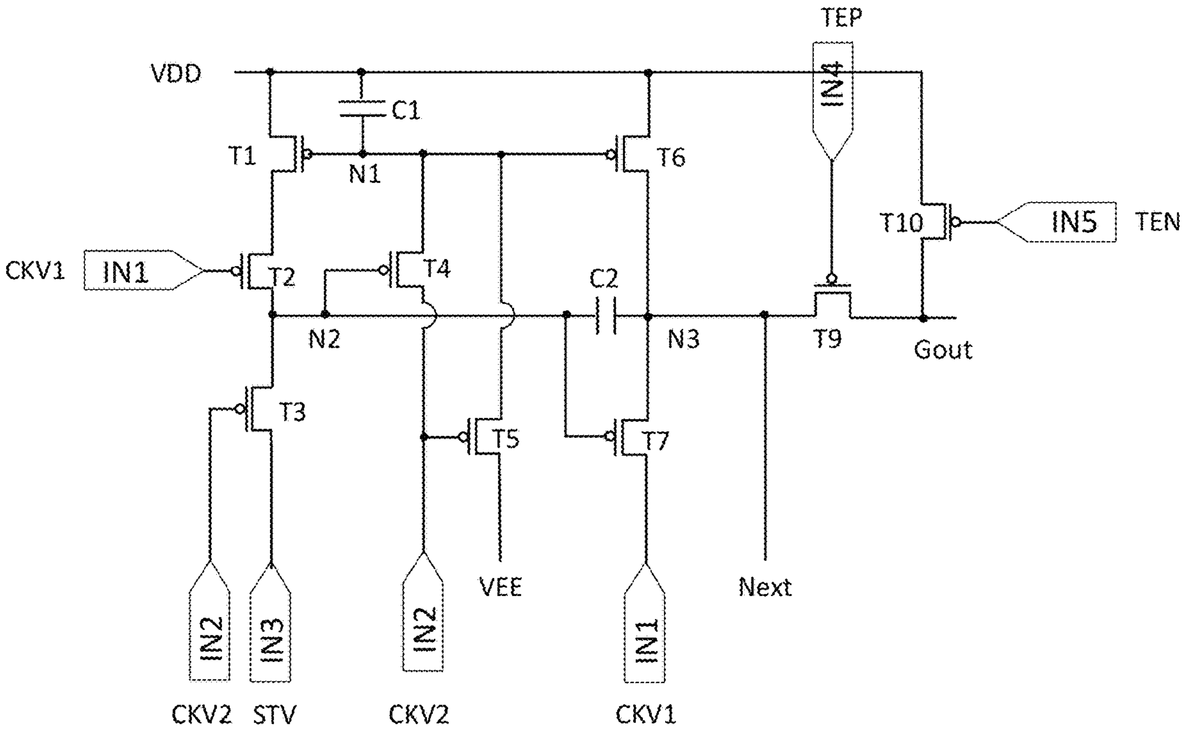
FIG. 2 is a circuit diagram of a driving unit according to a first embodiment of the present disclosure.

FIG. 2 is a circuit diagram of a driving unit according to a first embodiment of the present disclosure. As shown in FIG. 2, the driving unit of the driving circuit in the first embodiment of the present disclosure includes a first transistor T1, a second transistor T2, a third transistor T3, a fourth transistor T4, a fifth transistor T5, a sixth transistor T6, a seventh transistor T7, a ninth transistor T9, a tenth transistor T10, a first capacitor C1 and a second capacitor C2. A first electrode of the first transistor T1 is coupled to a first power supply voltage VDD, and a gate of the first transistor T1 is coupled to a first node N1. A first electrode of the second transistor T2 is coupled to a second electrode of the first transistor T1, a second electrode of the second transistor T2 is coupled to a second node N2, and a gate of the second transistor T2 is coupled to a first input terminal IN1. A first electrode of the third transistor T3 is coupled to a second node N2, a second electrode of the third transistor T3 is coupled to a third input terminal IN3, and a gate of the third transistor T3 is coupled to a second input terminal IN2. A first electrode of the fourth transistor T4 is coupled to the first node N1, a second electrode of the fourth transistor T4 is coupled to the second input terminal IN2, and a gate of the fourth transistor T4 is coupled to the second node N2. A first electrode of the fifth transistor T5 is coupled to the first node N1, a second electrode of the fifth transistor T5 is coupled to a second power supply voltage VEE, and a gate of the fifth transistor T5 is coupled to the second input terminal IN2. A first electrode of the sixth transistor T6 is coupled to the first power supply voltage VDD, a second electrode of the sixth transistor T6 is coupled to a third node N3, and a gate of the sixth transistor T6 is coupled to the first node N1. A first electrode of the seventh transistor T7 is coupled to the third node N3, a second electrode of the seventh transistor T7 is coupled to the first input terminal IN1, and a gate of the seventh transistor T7 is coupled to the second node N2. A first electrode of the ninth transistor T9 is coupled to the third node N3, and a second electrode of the ninth transistor T9 is coupled to an output terminal Gout. A first electrode of the tenth transistor T10 is coupled to the first power supply voltage VDD, and a second electrode of the tenth transistor T10 is coupled to the output terminal Gout. A first electrode of the first capacitor C1 is coupled to the first power supply voltage VDD, and a second electrode of the first capacitor C1 is coupled to the first node N1. A first electrode of the second capacitor C2 is coupled to the second node N2, and a second electrode of the second capacitor C2 is coupled to the third node N3. A gate of the ninth transistor T9 is coupled to a fourth input terminal IN4. A gate of the tenth transistor T10 is coupled to a fifth input terminal IN5, but is not limited thereto. In this embodiment, the first transistor T1, the second transistor T2, the third transistor T3, the fourth transistor T4, the fifth transistor T5, the sixth transistor T6, the seventh transistor T7, the ninth transistor T9, and the tenth transistor T10 are all P-type MOS transistors. In this embodiment, the gate of the ninth transistor T9 and the gate of the tenth transistor T10 respectively receive a first control signal and a second control signal of the first control signal group, and the first control signal and the second control signal are signals reverse to each other.

Figure 3:
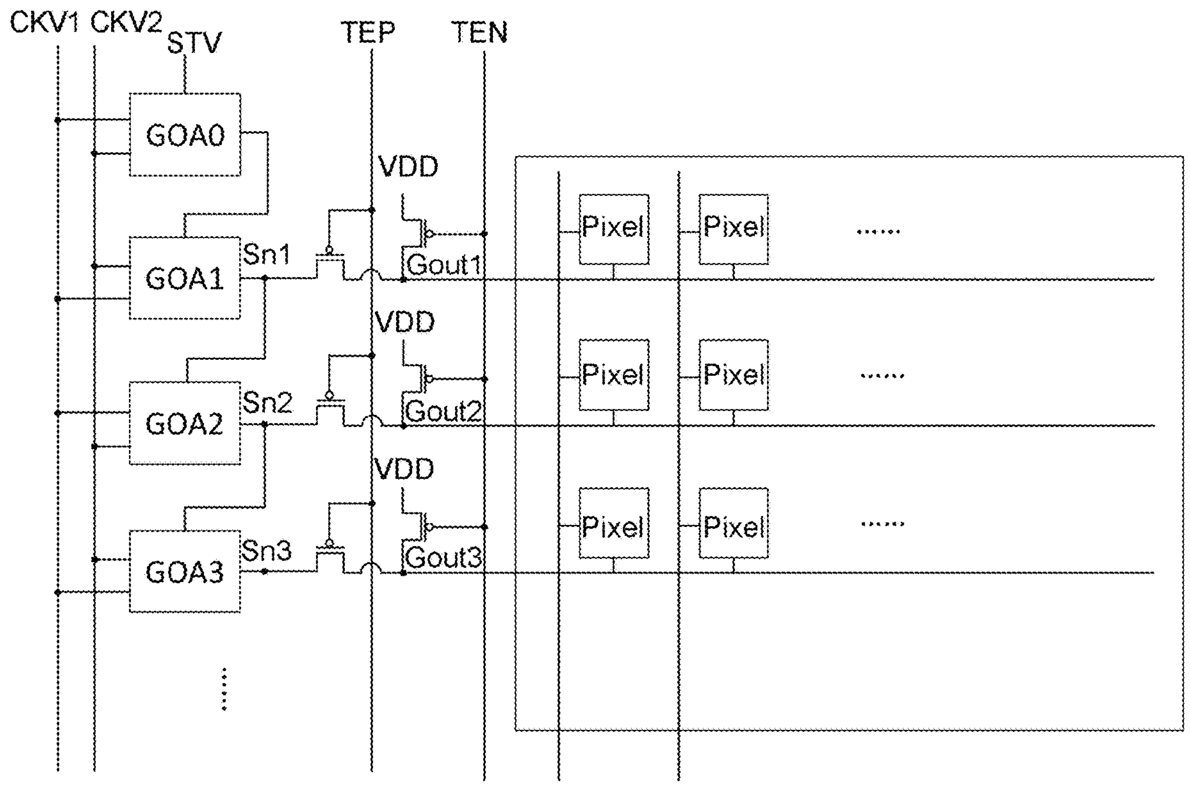
FIG. 3 is a circuit diagram of a driving circuit according to a first embodiment of the present disclosure.

FIG. 3 is a circuit diagram of a driving circuit according to a first embodiment of the present disclosure. As shown in FIG. 3, the driving circuit of the present disclosure further includes a first signal lead CKV1, a second signal lead CKV2, a fourth signal lead TEP and a fifth signal lead TEN. The driving voltage of the driving unit in the previous row is output to the third input terminal IN3 of the driving unit in the next row as a starting signal. The first input terminal IN1 is coupled to the first signal lead CKV1. The second input terminal IN2 is coupled to the second signal lead CKV2. The fourth input terminal IN4 is coupled to the fourth signal lead TEP. The fifth input terminal IN5 is coupled to the fifth signal lead TEN.

In this embodiment, the driving circuit further includes a starting signal lead STV, and the third input terminal IN3 of the driving unit in the first row is coupled to the starting signal lead STV.

Figure 4:
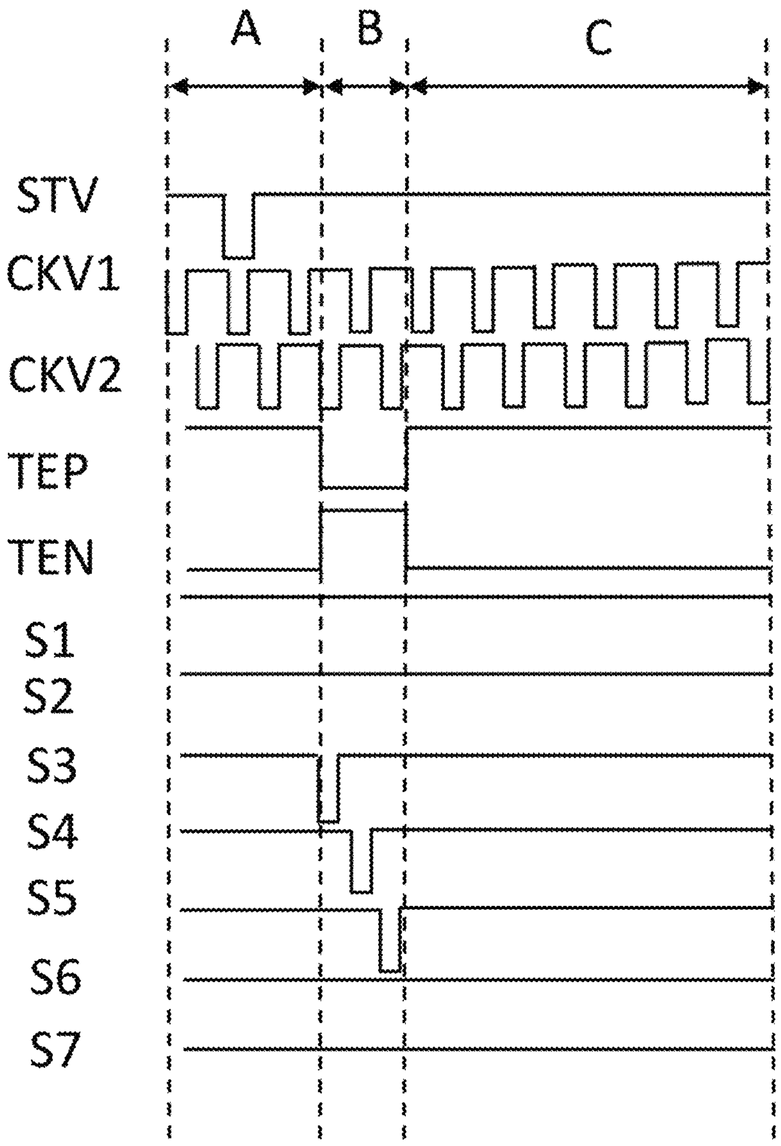
FIG. 4 is a waveform diagram of a driving circuit according to a first embodiment of the present disclosure.
Figure 5:
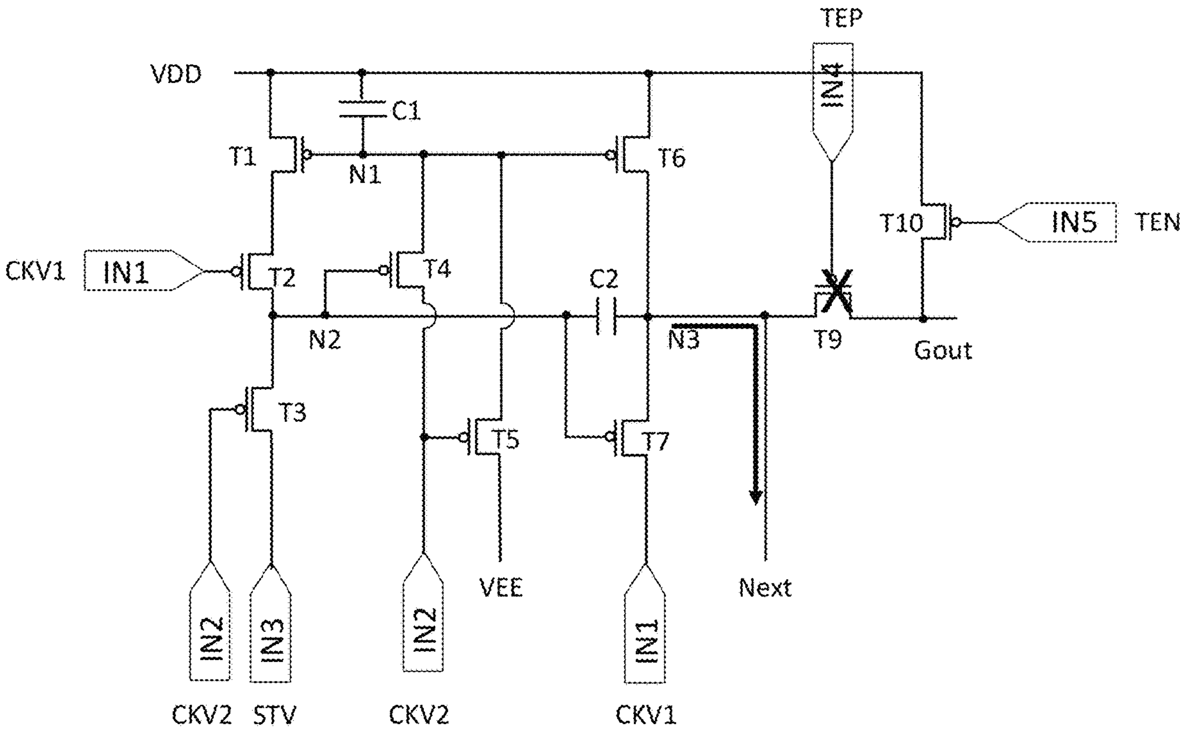
FIG. 5 is a schematic diagram of a turned-on state of a driving unit in phases A and C in FIG. 4.
Figure 6:
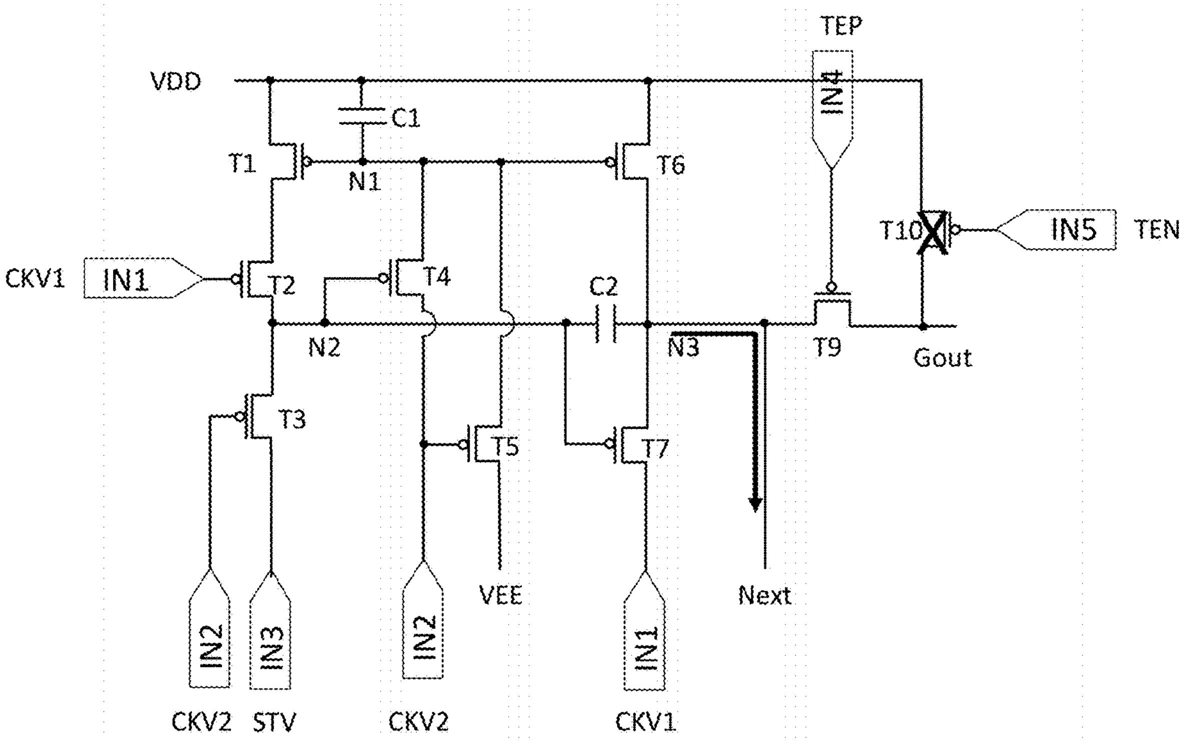
FIG. 6 is a schematic diagram of a turned-on state of a driving unit in phase B in FIG. 4.
Figure 7:
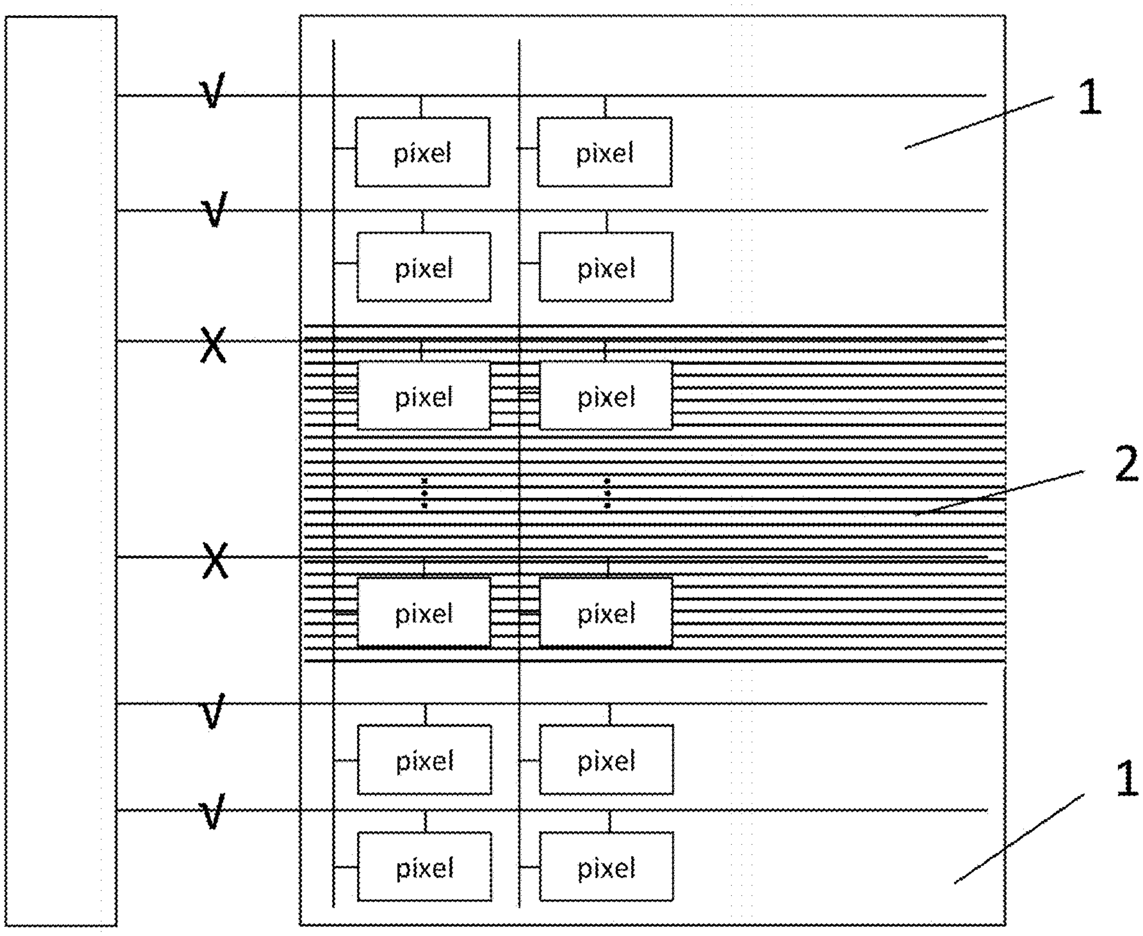
FIG. 7 is a schematic diagram of use effect of the present disclosure.

The specific circuit conduction states of a driving unit in the driving circuit of the first embodiment of the present disclosure in stages A to C and the corresponding pulse waveform diagrams are illustrated below with reference to FIGS. 4 to 7. FIG. 4 is a waveform diagram of the driving circuit of the first embodiment of the present disclosure. FIG. 5 is a schematic diagram of a conduction state of the driving unit in stages A and C as shown in FIG. 4. FIG. 6 is a schematic diagram of a conduction state of the driving unit in stage B as shown in FIG. 4. FIG. 7 is a schematic diagram of the use effect of the present disclosure. The use of "X" in FIGS. 5 and 6 indicates that the transistor is turned off.

As shown in FIGS. 4, 5 and 7, the driving unit of the present disclosure is in the static display region 1 in stage A, a high level is input to the fourth input terminal IN4, and a low level is input to the fifth input terminal IN5.

Then the first transistor T1 to the seventh transistor T7 are turned on, the ninth transistor T9 is turned off, and the tenth transistor T10 is turned on.

Finally, the driving voltage of the driving unit of the static display region 1 is normally output to the next stage Next, and the output terminal Gout outputs a high level, maintaining the previous frame image data of the relevant pixel row of the static display region 1 of the display panel without updating. For example, scan signals S1 and S2 for corresponding pixel rows are at the high level as shown in FIG. 4, which maintains the previous frame image data of these pixel rows without updating.

As shown in FIGS. 4, 6 and 7, the driving unit of the present disclosure is in the dynamic display region 2 in stage B, a low level is input to the fourth input terminal IN4, and a high level is input to the fifth input terminal IN5.

Then the first transistor T1 to the seventh transistor T7 are turned on, the ninth transistor T9 is turned on, and the tenth transistor T10 is turned off.

Finally, the driving voltage of the driving unit of the dynamic display region 2 is normally output to the next stage Next, and the output terminal Gout outputs a low level to update the previous frame image data of the relevant pixel row of the dynamic display region 2 of the display panel. For example, scan signals S3 to S5 for corresponding pixel rows are at the low level as shown in FIG. 4, updating the previous frame image data of these pixel rows.

As shown in FIGS. 4, 5 and 7, the driving unit of the present disclosure is in the static display region 1 in stage C, a high level is input to the fourth input terminal IN4, and a low level is input to the fifth input terminal IN5.

Then the first transistor T1 to the seventh transistor T7 are turned on, the ninth transistor T9 is turned off, and the tenth transistor T10 is turned on.

Finally, the driving voltage of the driving unit of the static display region 1 is normally output to the next stage Next, and the output terminal Gout outputs a high level, maintaining the previous frame image data of the relevant pixel row of the static display region 1 of the display panel without updating. For example, scan signals S6 and S7 for corresponding pixel rows are at the high level as shown in FIG. 4, which maintains the previous frame image data of these pixel rows without updating.

So far, a refresh process of the display panel from top to bottom is completed and it proceeds to the next refresh.

The present disclosure also provides a driving method, which is applied to the driving circuit of the display panel with regional varying refresh rates as described above, the method including:

- in the static display region, receiving, by the driving unit of the relevant pixel row; a first control signal group sent jointly by a fourth signal lead TEP and a fifth signal lead TEN, and outputting the driving voltage of the driving unit to the driving unit of the next row, wherein an output signal Gout of the driving unit outputs a high level to maintain picture data of the pixel row in a previous frame; and
- in the dynamic display region, receiving, by the driving unit of the relevant pixel row, a second control signal group sent jointly by the fourth signal lead TEP and the fifth signal lead TEN, and outputting the driving voltage of the driving unit to the output signal Gout of the driving unit and the driving unit of the next row, respectively, to update the picture data of the pixel row in the previous frame.

Figure 8:
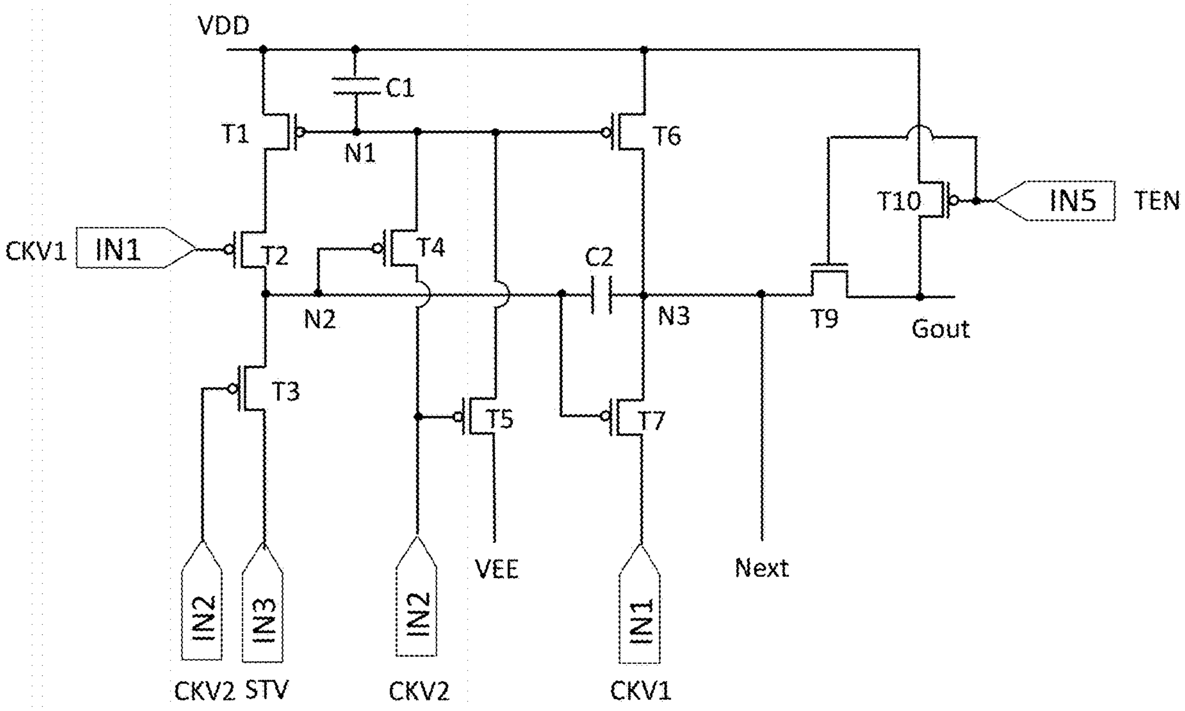
FIG. 8 is a circuit diagram of a driving unit according to a second embodiment of the present disclosure.

FIG. 8 is a circuit diagram of a driving unit according to a second embodiment of the present disclosure. As shown in FIG. 8, the driving unit of the second embodiment of the present disclosure differs from the driving unit of the first embodiment in the following.

In this embodiment, the first transistor T1, the second transistor T2, the third transistor T3, the fourth transistor T4, the fifth transistor T5, the sixth transistor T6, the seventh transistor T7 and the tenth transistor T10 are all P-type MOS transistors, and the ninth transistor T9 is an N-type MOS transistor.

In this embodiment, the gate of the ninth transistor T9 and the gate of the tenth transistor T10 respectively receive the same control signal of the first control signal group, and the gate of the ninth transistor T9 and the gate of the tenth transistor T10 are respectively coupled to the fifth input terminal IN5, and the fifth input terminal IN5 is coupled to the fifth signal lead TEN.

This embodiment can accomplish the same functions as the first embodiment, which will not be described in detail here.

In summary, the display panel with regional varying refresh rates and the driving method of the present disclosure enables the display panel to update the picture by regions, maintain a high refresh rate in the dynamic display region of the picture, and adjust the static display region of the picture to a low refresh rate, thereby reducing the power consumption of the display panel and extending the service life of the display panel.

Those described above are the specific embodiments of the present disclosure. It should be understood that the present disclosure is not limited to the above specific embodiments, and those skilled in the art can make various modifications or variations within the scope of the claims, which do not affect the substance of the present disclosure.

What is claimed is:

1. A display panel with regional varying refresh rates, comprising:

a driving circuit, configured to receive a first control signal group corresponding to a static display region with invariable pictures in a display area of the display panel, to cause a driving voltage of a relevant pixel row of the static display region to be output to a driving circuit of a next row and cause an output signal of the driving circuit to maintain a high level; or to receive a second control signal group corresponding to a dynamic display region with variable pictures in the display area of the display panel, to cause a driving voltage of a relevant pixel row of the dynamic display region to be output to a driving circuit of a next row and the output signal of the driving circuit, respectively, wherein the driving circuit comprises a plurality of rows of driving units, and the driving unit comprises:

a first transistor, wherein a first electrode of the first transistor is coupled to a first power supply voltage, and a gate of the first transistor is coupled to a first node;

a second transistor, wherein a first electrode of the second transistor is coupled to a second electrode of the first transistor, a second electrode of the second transistor is coupled to a second node, and a gate of the second transistor is coupled to a first input terminal;

a third transistor, wherein a first electrode of the third transistor is coupled to the second node, a second electrode of the third transistor is coupled to a third input terminal, and a gate of the third transistor is coupled to a second input terminal;

a fourth transistor, wherein a first electrode of the fourth transistor is coupled to the first node, a second electrode of the fourth transistor is coupled to the second input terminal, and a gate of the fourth transistor is coupled to the second node;

a fifth transistor, wherein a first electrode of the fifth transistor is coupled to the first node, a second electrode of the fifth transistor is coupled to a second power supply voltage, and a gate of the fifth transistor is coupled to the second input terminal;

a sixth transistor, wherein a first electrode of the sixth transistor is coupled to the first power supply voltage, a second electrode of the sixth transistor is coupled to a third node, and a gate of the sixth transistor is coupled to the first node;

a seventh transistor, wherein a first electrode of the seventh transistor is coupled to the third node, a second electrode of the seventh transistor is coupled to the first input terminal, and a gate of the seventh transistor is directly coupled to the second node;

an eighth transistor, wherein a first electrode of the eighth transistor is coupled to the third node, and a second electrode of the eighth transistor is directly coupled to an output terminal;

a ninth transistor, wherein a first electrode of the ninth transistor is directly coupled to the first power supply voltage, and a second electrode of the ninth transistor is directly coupled to the output terminal;

a first capacitor, wherein a first electrode of the first capacitor is coupled to the first power supply voltage, and a second electrode of the first capacitor is coupled to the first node; and a second capacitor, wherein a first electrode of the second capacitor is directly coupled to the second node, and a second electrode of the second capacitor is coupled to the third node;

wherein a gate of the eighth transistor is coupled to a fourth input terminal, and a gate of the ninth transistor is coupled to a fifth input terminal.

2. The display panel with regional varying refresh rates according to claim 1, wherein the first transistor, the second transistor, the third transistor, the fourth transistor, the fifth transistor, the sixth transistor, the seventh transistor, the eighth transistor, and the ninth transistor are all P-type MOS transistors.

3. The display panel with regional varying refresh rates according to claim 2, wherein the gate of the eighth transistor and the gate of the ninth transistor respectively receive a first control signal and a second control signal of the first control signal group.

4. The display panel with regional varying refresh rates according to claim 3, wherein the first control signal and the second control signal are signals reverse to each other.

5. The display panel with regional varying refresh rates according to claim 1, wherein the first transistor, the second transistor, the third transistor, the fourth transistor, the fifth transistor, the sixth transistor, the seventh transistor, and the ninth transistor are P-type MOS transistors, and the eighth transistor is an N-type MOS transistor.

6. The display panel with regional varying refresh rates according to claim 5, wherein the gate of the eighth transistor and the gate of the ninth transistor respectively receive the same control signal of the first control signal group.

7. The display panel with regional varying refresh rates according to claim 1, wherein the driving circuit further comprises a first signal lead, a second signal lead, a fourth signal lead and a fifth signal lead;

the driving voltage of the driving unit in a previous row is output to the third input terminal of the driving unit in the next row as a starting signal;

the first input terminal is coupled to the first signal lead;

the second input terminal is coupled to the second signal lead;

the fourth input terminal is coupled to the fourth signal lead; and the fifth input terminal is coupled to the fifth signal lead.

8. The display panel with regional varying refresh rates according to claim 7, wherein the driving circuit further comprises a starting signal lead, and the third input terminal of the driving unit in the first row is coupled to the starting signal lead.

9. A driving method, applied to a driving circuit of a display panel with regional varying refresh rates, the driving circuit of the display panel being configured to receive a first control signal group corresponding to a static display region with invariable pictures in a display area of the display panel, to cause a driving voltage of a relevant pixel row of the static display region to be output to a driving circuit of a next row and cause an output signal of the driving circuit to maintain a high level, or to receive a second control signal group corresponding to a dynamic display region with variable pictures in the display area of the display panel, to cause a driving voltage of a relevant pixel row of the dynamic display region to be output to a driving circuit of a next row and the output signal of the driving circuit, respectively, the method comprising:

in the static display region, receiving, by the driving circuit of the relevant pixel row, a first control signal group sent jointly by a fourth signal lead and a fifth signal lead, and outputting the driving voltage of the driving circuit to the driving circuit of the next row, wherein an output signal of the driving circuit is output at a high level to maintain picture data of the pixel row in a previous frame; and in the dynamic display region, receiving, by the driving circuit of the relevant pixel row, a second control signal group sent jointly by the fourth signal lead and the fifth signal lead, and outputting the driving voltage of the driving circuit to the output signal of the driving circuit and the driving circuit of the next row, respectively, to update the picture data of the pixel row in the previous frame, wherein the driving circuit comprises a plurality of rows of driving units, and the driving unit comprises:

a first transistor, wherein a first electrode of the first transistor is coupled to a first power supply voltage, and a gate of the first transistor is coupled to a first node;

a second transistor, wherein a first electrode of the second transistor is coupled to a second electrode of the first transistor, a second electrode of the second transistor is coupled to a second node, and a gate of the second transistor is coupled to a first input terminal;

a third transistor, wherein a first electrode of the third transistor is coupled to the second node, a second electrode of the third transistor is coupled to a third input terminal, and a gate of the third transistor is coupled to a second input terminal;

a fourth transistor, wherein a first electrode of the fourth transistor is coupled to the first node, a second electrode of the fourth transistor is coupled to the second input terminal, and a gate of the fourth transistor is coupled to the second node;

a fifth transistor, wherein a first electrode of the fifth transistor is coupled to the first node, a second electrode of the fifth transistor is coupled to a second power supply voltage, and a gate of the fifth transistor is coupled to the second input terminal;

a sixth transistor, wherein a first electrode of the sixth transistor is coupled to the first power supply voltage, a second electrode of the sixth transistor is coupled to a third node, and a gate of the sixth transistor is coupled to the first node;

a seventh transistor, wherein a first electrode of the seventh transistor is coupled to the third node, a second electrode of the seventh transistor is coupled to the first input terminal, and a gate of the seventh transistor is directly coupled to the second node;

an eighth transistor, wherein a first electrode of the eighth transistor is coupled to the third node, and a second electrode of the eighth transistor is directly coupled to an output terminal;

a ninth transistor, wherein a first electrode of the ninth transistor is directly coupled to the first power supply voltage, and a second electrode of the ninth transistor is coupled to the output terminal;

a first capacitor, wherein a first electrode of the first capacitor is coupled to the first power supply voltage, and a second electrode of the first capacitor is coupled to the first node; and a second capacitor, wherein a first electrode of the second capacitor is directly coupled to the second node, and a second electrode of the second capacitor is coupled to the third node;

wherein a gate of the eighth transistor is coupled to a fourth input terminal, and a gate of the ninth transistor is coupled to a fifth input terminal.

10. The driving method according to claim 9, wherein the first transistor, the second transistor, the third transistor, the fourth transistor, the fifth transistor, the sixth transistor, the seventh transistor, the eighth transistor, and the ninth transistor are all P-type MOS transistors.

11. The driving method according to claim 10, wherein the gate of the eighth transistor and the gate of the ninth transistor respectively receive a first control signal and a second control signal of the first control signal group.

12. The driving method according to claim 11, wherein the first control signal and the second control signal are signals reverse to each other.

13. The driving method according to claim 9, wherein the first transistor, the second transistor, the third transistor, the fourth transistor, the fifth transistor, the sixth transistor, the seventh transistor, and the ninth transistor are P-type MOS transistors, and the eighth transistor is an N-type MOS transistor.

14. The driving method according to claim 13, wherein the gate of the eighth transistor and the gate of the ninth transistor respectively receive the same control signal of the first control signal group.

15. The driving method according to claim 9, wherein the driving circuit further comprises a first signal lead, a second signal lead, a fourth signal lead and a fifth signal lead;

the driving voltage of the driving unit in a previous row is output to the third input terminal of the driving unit in the next row as a starting signal;

the first input terminal is coupled to the first signal lead;

the second input terminal is coupled to the second signal lead;

the fourth input terminal is coupled to the fourth signal lead; and the fifth input terminal is coupled to the fifth signal lead.

16. The driving method according to claim 15, wherein the driving circuit further comprises a starting signal lead, and the third input terminal of the driving unit in the first row is coupled to the starting signal lead.

* * * * *